United States Patent [19]

Bodine

[11] Patent Number: 4,830,758
[45] Date of Patent: May 16, 1989

[54] SONIC METHOD AND APPARATUS FOR WINNING MINERALS FROM LIQUID CARRIERS

[76] Inventor: Albert G. Bodine, 7877 Woodley Ave., Van Nuys, Calif. 91406

[21] Appl. No.: 938,002

[22] Filed: Dec. 3, 1986

[51] Int. Cl.$^4$ .................. B01D 11/02; C25C 1/00; C25C 7/06
[52] U.S. Cl. .................. 210/748; 210/269; 204/47.5; 204/233; 204/273; 266/170; 75/101 R; 422/127
[58] Field of Search .............. 210/748, 280, 269, 282; 204/47.5, 222, 233, 273, 285, 307, 261; 134/1, 184; 266/168, 170; 422/127, 128; 75/101 R

[56] References Cited

U.S. PATENT DOCUMENTS

| | | | |
|---|---|---|---|
| 2,861,932 | 11/1958 | Pohl | 204/273 |
| 3,351,539 | 11/1967 | Branson | 204/222 |
| 3,427,231 | 2/1969 | Schneider et al. | 204/47.5 |
| 3,525,606 | 8/1970 | Bodine | 422/127 |
| 4,256,557 | 3/1981 | Soboroff et al. | 204/149 |
| 4,330,375 | 5/1982 | Worz et al. | 134/1 |
| 4,566,800 | 1/1986 | Bodine | 366/118 |

FOREIGN PATENT DOCUMENTS 2081744 2/1982 United Kingdom ............ 210/748

OTHER PUBLICATIONS

"Ultrasonics in the Plating Industry", W. D. Mogerman, *Plating*, Aug. 1967, pp. 941-947.

Primary Examiner—Richard V. Fisher
Assistant Examiner—Linda S. Evans
Attorney, Agent, or Firm—Edward A. Sokolski

[57] ABSTRACT

A liquid carrier having mineral ore in the form of free particles or a salt dissolved therein is contained within a suitable container. A box member which has walls which are pervious to the liquid by virtue of apertures formed therein or the porous nature of such walls is filled with a collection material such as carbon which may be in the form of filaments or particles. This box member is suspended in the liquid carrier. An elastic member which may be a plate of steel has an orbitting mass oscillator attached to the top end thereof. This elastic member is suspended in the liquid in opposing relationship to the box member. The rotor of the oscillator is rotatably driven so as to generate sonic energy in the elastic member. The carbon particles provide an electrode of an electrolytic system such that the mineral in the carrier, e.g. gold migrates to the carbon particles and deposits thereon. The sonic energy enhances the migration of such mineral particles to the collection material and also tends to clean off impurities such as fine clay from the carbon. Further, excess accumulations of mineral are peeled off from the collection material and dropped to the bottom of the container from where they can easily be removed.

10 Claims, 1 Drawing Sheet

SONIC METHOD AND APPARATUS FOR WINNING MINERALS FROM LIQUID CARRIERS

This invention relates to the winning of minerals from liquid carriers and more particularly to the use of sonic energy in enhancing this operation.

An effective technique for use in the leaching or extraction of minerals from ore is described in my U.S. Pat. No. 4,566,800 issued Jan. 28, 1986. In the operation described in said patent, sonic energy is applied to a leaching solution mixed with mineral ore to effect the dissolution or entrainment of mineral particles into the solution thus separating them from the parent ore material. The present invention is concerned with a method and apparatus for winning the mineral from the leached solution in which it is dissolved or entrained.

It has been found that mineral can be extracted or won from a carrier liquid by an electrolytic effect established between two dissimilar materials such as gold and carbon or copper and steel. This process can be enhanced by means of externally generated electrical potentials but in many instances, the external potential is not required. Thus, it has been found that if carbon material is placed in contact with a liquid carrier containing gold salts that the gold will gravitate to the carbon and deposit itself thereon, this being an effective technique for winning the gold from the carrier. It has been found that quite often the deposited mineral has traces of impurities such as fine clay which poisons the collection surface and thus ruins its effectivity in gathering the mineral particles. Further, the mineral often tends to build up on the collection surface, forming protuberances which can short out electrodes where externally applied voltage is employed.

The method of the present invention obviates the aforementioned shortcomings by employing sonic energy which acts to effectively clean the collection surfaces of impurities and to shed a buildup of the mineral on such surfaces so that the mineral can be easily collected. Further, this sonic energy tends to enhance the migration of the mineral particles to the material on which it is deposited. Moreover, the sonic energy will "finish" the actual prior leaching step by causing the leaching solution to further act upon remaining ore particles in the mixture.

This end result is achieved in the present invention by suspending a box member containing the collection material, which may be in the form of particles or filaments, in the leaching solution in which the mineral, and possibly some ore material, is being carried. This box member has liquid permeable sides which may be formed by apertures or by fabricating such sides of porous materials such that the particles of mineral are free to migrate to the interior of the box. An elastic member which may be a steel plate is suspended in the solution immediately opposite the box member, this elastic member having an orbiting mass oscillator attached thereto. This oscillator is driven at a sonic frequency such as to set up sonic elastic vibration of the elastic member. The sonic energy transmitted from the elastic member into the liquid carrier effectively removes foreign particles such as fine clay from the collection material in the box and further peels off mineral material deposited on the collection material so that this material can drop to the bottom of the liquid container for collection. In addition the sonic energy enhances the migration of the mineral particles to the collection material by agitating such particles. Also as mentioned the transmission of sonic energy into the mixture will cause further final leaching from ore particles in said mixture.

It is therefore an object of this invention to facilitate the winning of minerals from liquid carriers and ores by means of sonic energy.

Other objects of the invention will become apparent as the description proceeds in connection with the accompanying drawings of which:

Figure 1:
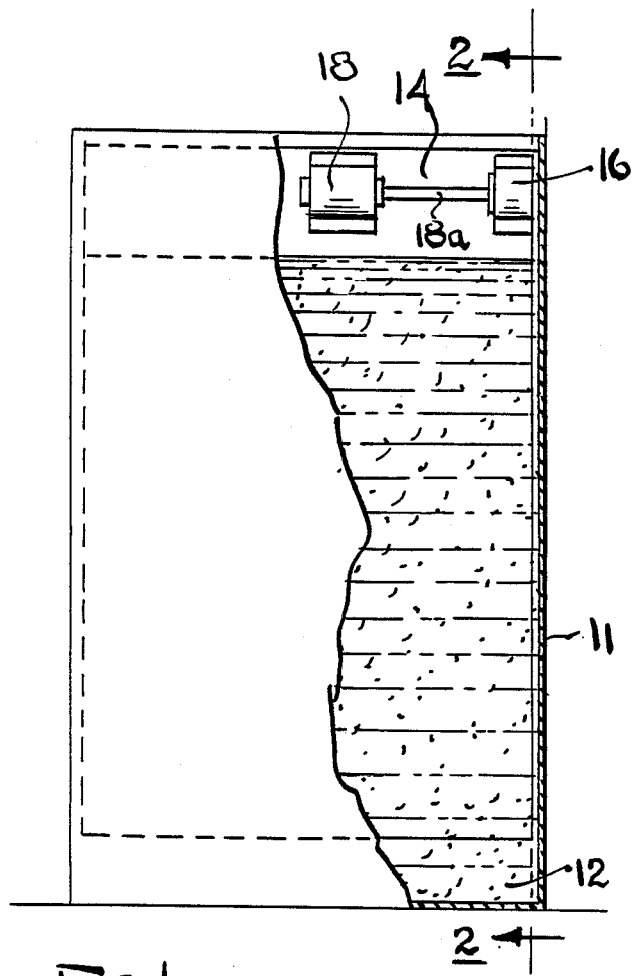
FIG. 1 is a side elevational view with partial cutaway section illustrating the method of the invention.
Figure 2:
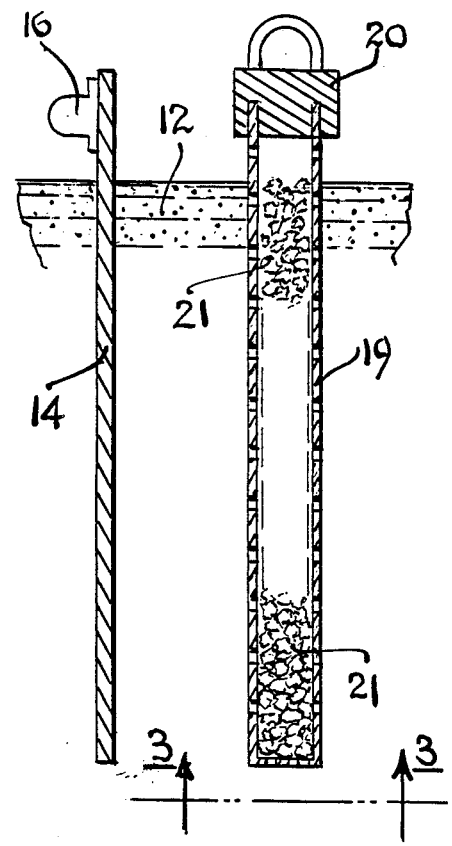
FIG. 2 is a cross sectional view taken along the plane indicated by 2—2 in FIG. 1.
Figure 3:
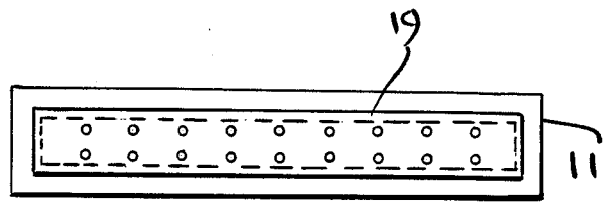
FIG. 3 is a view taken along the plane indicated by 3—3 in FIG. 2.

Referring to the Figures tank 11 contains a leaching solution or mixture 12 in which mineral particles are either dissolved or suspended. Plate member 14, which may be of a suitable elastic material such as steel; has the housing of orbiting mass oscillator 16 fixedly attached thereto. Mounted on plate 14 on suitable conventional vibration isolators which may be rubber mounts or the like (not shown) is motor 18, the drive shaft 18a of which is coupled to the rotor of oscillator 16. Orbiting mass oscillator 16 may be an oscillator such as described in my U.S. Pat. No. 4,265,129 issued May 5, 1981 and having an eccentric mass rotor. Plate member 14 is suspended within leaching solution 12 by suitable means such as cables (not shown).

Rectangular box member 19 has walls which are pervious to liquid by virtue of apertures formed therein or by use of a porous material for these walls, such that liquid is free to enter the interior of the box. Contained within box 19 are particles or filaments 21 of a material such as carbon. The top end of box 19 has a suspension member 20 attached thereto by means of which the box can be suspended in the leaching solution 12 directly opposite plate member 14. While carbon particles are employed in the illustrative example which involves the winning of gold from the carrier, other materials such as steel shavings would be used if the mineral were copper, etc. Oscillator 16 is preferably driven at a frequency such as to set up resonant standing wave vibration of plate member 14.

The sonic energy effectively removes impurities and other foreign matter from the carbon and peels off accumulations of gold from the surfaces of the carbon material such that the gold drops to the bottom of container 11 from where it can later be removed. Further, the sonic energy facilitates the migration of the mineral to the carbon particles by virtue of the stirring or agitating and leaching effect that it produces in the liquid. In addition the sonic energy operates to complete the leaching of any last patticles of the ore which may remain.

While the invention has been described and illustrated in detail, it is to be clearly understood that this is by way of illustration and example only and is not to be taken by way of limitation, the spirit and scope of the invention being limited only by the terms of the following claims.

I claim:

1. A method for winning a mineral from a liquid carrier comprising the steps of:
   immersing a collection material in a liquid carrier containing a mineral, said material being adapted to attract said mineral for collection on the surface thereof, and transmitting sonic energy to said liquid carrier,
the mineral migrating to the surface of said collection material,
the sonic energy facilitating the migration of the mineral and causing foreign matter and mineral collected on the surface of said collection material to be separated therefrom.

2. The method of claim 1 wherein said sonic energy is transmitted to said liquid carrier from an elastic member suspended in said liquid carrier opposite the collection material, said elastic member being sonically driven by means of a sonic oscillator attached thereto.

3. The method of claim 2 wherein said elastic member is driven at a sonic frequency at which said elastic member vibrates resonantly.

4. The method of claim 2 wherein said oscillator is an orbiting mass oscillator.

5. The method of claim 2 wherein said collection material is contained within a box member having walls pervious to the liquid carrier, said elastic member being positioned directly opposite said box member.

6. The method of claim 1 wherein said liquid carrier comprises a leaching solution and said mineral comprises gold salts dissolved in said solution, said collection material comprising carbon.

7. The method of claim 1 wherein said liquid carrier comprises a leaching solution having ore particles remaining therein, the sonic energy aiding the leaching of said ore particles.

8. Apparatus for winning a mineral from a liquid carrier comprising,
a tank,
a liquid carrier containing a mineral contained in said tank,
a box member having liquid pervious walls containing a collection material adapted to attract said mineral for deposit on the surface thereof,
an elastic member immersed in said liquid carrier and positioned directly opposite said box member,
an orbiting mass oscillator attached to said elastic member, and
means for driving said oscillator at a frequency so as to set up sonic elastic vibration of said elastic member,
sonic energy being transmitted from the elastic member to the liquid carrier to facilitate the migraiton of mineral from the carrier to the collection material and separate foreign matter and mineral from the surfaces of said collection material.

9. The apparatus of claim 8 wherein said orbiting mass oscillator is operable at a frequency such as to effect resonant standing wave vibration of said elastic member.

10. The apparatus of claim 8 wherein the mineral is gold and the collection material is carbon.

* * * * *